UNITED STATES PATENT OFFICE.

WILLIAM D. STEVENSON, OF PITTSBURGH, PENNSYLVANIA.

COMPOSITE ARTICLE INCLUDING PHENOL AND FORMALDEHYDE AND METHOD OF MAKING SAME.

1,295,230.     Specification of Letters Patent.     Patented Feb. 25, 1919.

No Drawing.     Application filed May 7, 1918. Serial No. 233,009.

*To all whom it may concern:*

Be it known that I, WILLIAM D. STEVENSON, a citizen of the United States, residing at Pittsburgh, in the county of Allegheny and State of Pennsylvania, have invented certain new and useful Improvements in Composite Articles Including Phenols and Formaldehyde and Methods of Making Same, of which the following is a specification.

This invention relates to a new and improved laminated article of manufacture and the method of making the same, and more particularly to a composite laminated article and method of making the same including infusible and insoluble condensation products of phenols and formaldehyde, or their equivalents.

In the manufacture of laminated sheet, plate or tubular articles, as heretofore practised, the agents employed for binding or fastening together the superposed layers of material, as paper, cloth, or other material, are of such a character that the composite articles are unsuited for many purposes, the binding agents being soluble in water, oils, neutral solvents, etc. In some instances, the laminated articles have been produced by the employment of a binding or cementing material not possessing the objectionable qualities above referred to, but so far as I am aware, all laminated articles of the character to which my invention relates, either when the binding material employed was of the first kind mentioned or of the second kind, have been manufactured by first coating a number of separate sheets or layers and then assembled by superposing one coated sheet upon another. Under this method, small confined air or gas pockets are produced; the composite article retains its distinct layers or laminations; and in drilling, machining, or performing similar work on the article, trouble occurs due to splitting, cracking or opening up along the lines of laminations.

The prime objects of the present invention are, to provide a new and improved method for the manufacture of a laminated sheet or tubular article of the class mentioned, and the production of an article possessing electrical insulating and heat resisting qualities, strength and durability, capable of withstanding the above mentioned solvents and of such a character that it may be machined and drilled without danger of splitting or cracking.

In carrying out my method, I first build up the laminated sheet or tubular article by superposing uncoated sheets or layers of material, such as paper, asbestos, or cloth, until an unfinished laminated sheet or tubular article of the desired thickness is obtained. This assembled material, free of any binding or cementing mixture, is then preferably, but not necessarily, stitched or quilted before subjecting the laminated article to condensation products of phenols and formaldehyde.

After the formation of the uncompleted article, as above described, it is saturated or impregnated with a liquid phenolic condensation product, preferably comprising phenols and formaldehyde of such character that it is capable, under the action of heat, of being transformed into an insoluble and high heat resisting body.

The saturation or partial saturation of the article may be accomplished by simply immersing the article in the aforesaid liquid, or immersing and applying pressure to the liquid to aid saturation, or by first subjecting the laminated article to a vacuum and afterward immersing without applying pressure to the liquid. Or it may be subjected to a vacuum and then immersed in a liquid having pressure applied thereto.

After the immersion in the liquid solution, the article is dried to some extent, or the excess liquid may be forced out of the same by application of pressure with or without heat.

In practice, I prefer to pass the saturated or impregnated article directly from the solution and before it is dried, through pressure rolls as this step will aid in eliminating air or gas pockets and any excess solution.

After the drying step last mentioned, heat is applied to the article with or without pressure, but preferably with pressure, thereby transforming the article into a compact insoluble and high heat resisting or infusible body.

In some instances, it may be desirable to further heat the article by subjecting it to a gradually increasing heat of an oven or other container.

It will be understood that my invention includes the making of tubular articles as well as articles of the character described in sheet or plate form, and when tubular articles are made, instead of employing separate superposed pieces, a continuous piece may be rolled or wound upon itself, after which the method of treating the superposed layers may be followed, as above set forth.

What I claim is:—

1. The method of making a composite article including a condensation product of phenols and formaldehyde which consists in superposing a plurality of uncoated layers of paper, cloth, or the like, subjecting the assembled superposed layers to a liquid phenolic condensation product to saturate the same, pressing or compacting the composite body and applying heat thereto.

2. The method of making a composite sheet or plate article including a condensation product of phenols and formaldehyde, which consists in superposing a plurality of uncoated pieces of paper, cloth, or the like, subjecting the assembled superposed pieces to a vacuum, subjecting the said pieces to a liquid phenolic condensation product to saturate the superposed pieces, pressing or compacting the composite body and applying heat thereto.

3. The method of making a composite sheet or plate article including a condensation product of phenols and formaldehyde, which consists in superposing a plurality of pieces of uncoated paper, cloth, or the like, stitching or quilting the assembled body, subjecting the body to a liquid phenolic condensation product to saturate the superposed pieces, pressing or compacting the composite body and applying heat thereto.

4. The method of making a composite sheet or plate article including a condensation product of phenols and formaldehyde, which consists in superposing a plurality of pieces of uncoated paper, cloth or the like, stitching or quilting the assembled body, subjecting the body to a vacuum, subjecting the body to a liquid phenolic condensation product to saturate or impregnate the superposed pieces, then pressing or compacting the composite body and applying heat thereto.

5. The method of making a composite article containing a condensation product of phenols and formaldehyde, which consists in immersing a plurality of superposed pieces of paper, cloth, or the like, in a liquid condensation product of phenols and formaldehyde to impregnate or saturate the superposed pieces with said liquid, removing the saturated article from the solution and subjecting the same to the action of pressure rolls to prevent the formation of air or gas pockets between the layers, and then rendering the article hard, insoluble and infusible by the application of heat and pressure.

6. A composite article consisting of superposed layers of paper or the like stitched together and including a condensation product of phenols and formaldehyde.

In testimony whereof I affix my signature in presence of two witnesses.

WILLIAM D. STEVENSON.

Witnesses:
  J. M. GEOGHEGAN,
  LOIS WINEMAN.